Dec. 19, 1967     S. M. ELLIS     3,358,513
BEARINGS
Filed Oct. 8, 1965     3 Sheets-Sheet 1
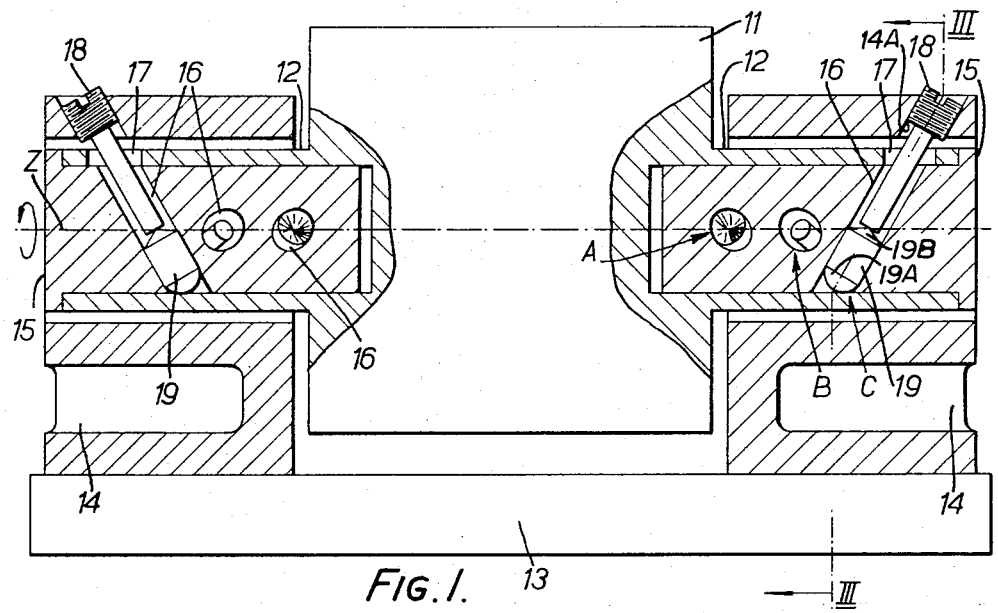
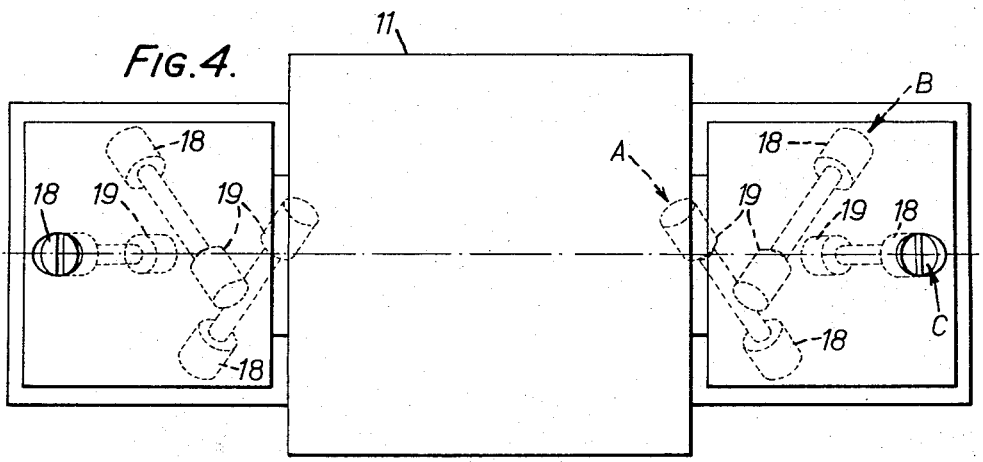
INVENTOR
Stafford Malcolm Ellis
BY
ATTORNEY Dec. 19, 1967     S. M. ELLIS     3,358,513
BEARINGS Filed Oct. 8, 1965     3 Sheets-Sheet 2

INVENTOR
Stafford Malcolm Ellis
BY
Bradford Gardin
ATTORNEY

United States Patent Office 3,358,513
Patented Dec. 19, 1967

3,358,513
BEARINGS
Stafford Malcolm Ellis, London, England, assignor to Elliott Brothers (London) Limited, London, England, a British company
Filed Oct. 8, 1965, Ser. No. 494,208
Claims priority, application Great Britain, Oct. 15, 1964, 42,048/64
12 Claims. (Cl. 74—5)

ABSTRACT OF THE DISCLOSURE

A bearing arrangement permitting limited rotational movement for a shaft, comprises fixed rod-shaped bearing members which extend into respective apertures in the shaft. Each aperture contains a conically pointed member, or one or more balls, which make bearing contact with the distal ends of the rod-shaped members in the apertures.

---

The invention relates to bearing arrangements.

According to one aspect of the invention, there is provided a bearing arrangement for relatively supporting two members for limited rotation with respect to each other about an axis passing through one said member, including two pairs of bearing parts, one bearing part of each pair being supported by the said one member and the other bearing part of each pair being supported by the other said member, the bearing parts being so arranged that the bearing parts of each pair make point contact with one another at points spaced apart along the axis and that, when an axial and a radial load are applied between the said members, reaction forces are created at the contact points which act along lines oblique to the axis but have components in the same axial direction, said lines lying in axial planes which are inclined to one another.

According to another aspect of the invention, there is provided a bearing arrangement for relatively supporting two members for limited rotation with respect to each other about an axis passing through one said member, including three spaced apertures in the said one member each intersecting the said axis at a different position therealong, three bearing parts respectively located in the apertures so as to be intersected by the axis, the bearing parts being arranged so that the normals to their surfaces through the points where they are respectively intersected by the axes lie in respective axial planes which are mutually angularly spaced about the axis with the angle between adjacent planes being less than 180°, and three arms supported by the other said member so as to project respectively into the said apertures, the end surface of each arm constituting a bearing part and making point contact in use with the bearing part in the respective aperture at the point of intersection by the said axis, one of each pair of bearing parts having a raised surface and the other having a flat or depressed surface, and the flat or depressed surfaces being arranged oblique to the axis so that they all partially face in the same direction along the axis.

According to a further aspect of the invention, there is provided a bearing arrangement for relatively supporting two members for limited rotation with respect to each other about an axis passing through one said member, comprising at least three apertures in the said one member each intersecting the said axis at a different position therealong, means supported by the said one member and located in each aperture so as to provide a bearing part lying on the said axis, and means supported by the other said member and projecting into each said aperture so as to provide a mating bearing part, point contact occurring in use between the two bearing parts in each aperture, and the bearing parts being respectively oriented so that when an axial end load is applied between the two members the resultant reaction forces at the points of contact have components acting in the same direction along the said axis which together balance the said axial end load, the resultant reaction forces lying respectively in axial planes which are mutually angularly spaced about the axis.

According to yet another aspect of the invention, there is provided apparatus including a bearing arrangement as defined in any of the three next preceding paragraphs.

Two bearing arrangements embodying the invention, and modifications thereof, will now be described by way of example and with reference to the accompanying drawings in which:

FIGURE 1 shows a side elevational view, partly in section on the line I—I of FIGURE 3, of a shaft supported in two similar bearing arrangements embodying the invention;

FIGURE 4 shows a somewhat diagrammatic plan view of the arrangement of FIGURE 1;

Figure 5:
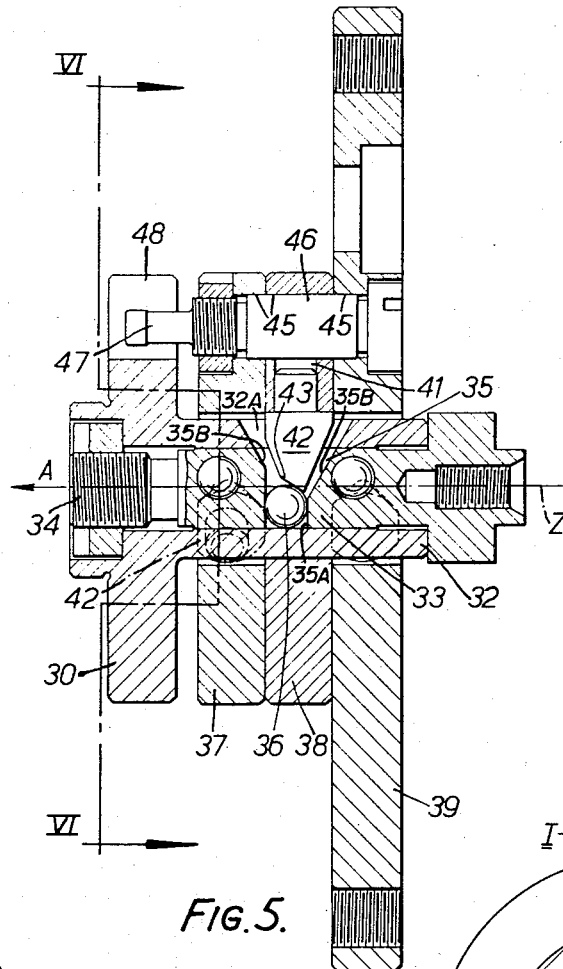
FIGURE 5 shows a sectional side elevation on the line V—V of FIGURE 6 of another bearing arrangement embodying the invention.

Referring now to FIGS. 1 to 4, there is shown a shaft 11 formed at each end with a tubular extension 12, mounted for limited rotational movement in a stator member 13.

The stator member 13 carries two stator end portions 14 each apertured so as to accommodate the tubular extensions 12 with freedom of movement therein.

Each tubular extension 12 contains a plug member 15 having apertures 16 formed therein which respectively co-operate with apertures 17 in the tubular extensions 12 and accommodate first and second contact bearing members 18 and 19 respectively.

The apertures 16, of which there are three for each bearing, are equi-angularly spaced about the axis of rotation Z of the arrangement. The apertures 16 are also formed at an angle to a plane normal of the axis of rotation Z so as to lie oblique to the axis, all angles being equal, such that the apertures at one end of the shaft lie in a direction which is towards the apertures at the other end of the shaft.

The second contact bearing members 19 are each of generally cylindrical shape, have hemi-spherical end portions 19A which abut the internal wall of the tubular extensions 12, and have conically shaped end portions 19B which abut the flat end surfaces of the first contact bearing members 18 which are of elongate shape. The members 18 are mounted in the stator end portions 14 by respective screw-threaded heads which co-operate with screw-threaded apertures 14A in the stator end portions 14.

Figure 2:
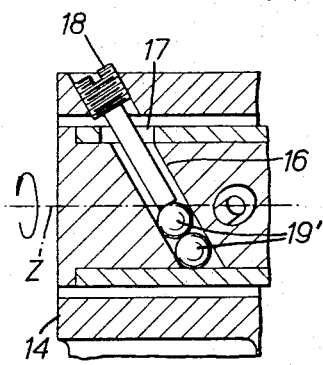
FIGURE 2 shows a sectional view of a modification of the bearing arrangements of FIGURE 1.
Figure 3:
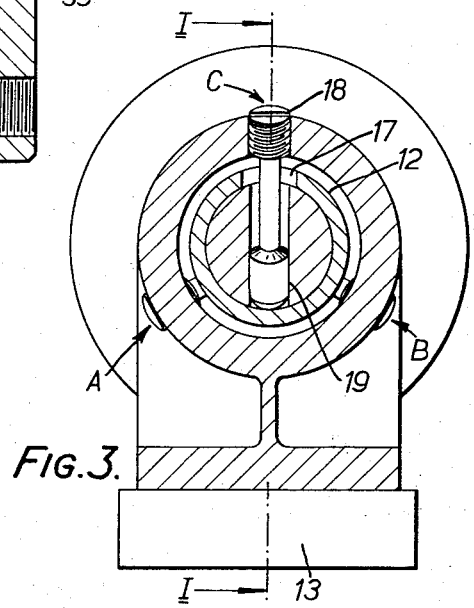
FIGURE 3 shows a part sectional view of the line III—III of FIGURE 1.

The second contact bearing members 19 of FIGURE 1 may instead be in the form of one or more ball bearings 19′ (see FIG. 2).

Point contact occurs at the mating contact bearing surfaces provided at the abutting portions of members 18 and 19, and the points of contact are arranged to lie on the axis of rotation Z.

The mating contact bearing surfaces therefore constrain the shaft 11 for limited rotation about the axis Z, the rotation being arrested when the contact bearing members 18 abut against the sides of the apertures 16 and 17. It will be seen that the provision of contact bearing surfaces which provide points of contact positioned on the axis of rotation Z ensures that any friction present at the points of contact has no moment arm with which to apply a torque to create rotational friction in opposition to the rotation of the shaft. During rotation of the shaft 11, the point of contact of each conically tipped member 19 with the flat surface at the end of the corresponding member 18, pivots on the end surface of the member 18. Because the members 18 are positioned in the apertures 16 and 17 so that their end surfaces lie oblique to the axis of rotation Z, this pivoting can take place without deformation of the mating contact bearing surfaces. As the limited rotation takes place, therefore, relative movement between the shaft 11 and the stator end portions 14 must take place along the axis of rotation Z. This movement results in bending of the stator end portions 14 so that they move apart slightly. It will be apparent that the obliquity of the end surfaces of the members 18 with respect to the axis Z must be sufficient to ensure that the reaction forces at the points of contact have components acting along the axis Z which can support the end load produced by the bending of the stator end portions 14. In a typical example, rotation of the shaft 11 through an angle of two minutes causes the stator end portions 14 to move apart axially through a distance of approximately 0.02 micro-inch, while rotation through an angle of one degree results in movement apart of the stator end portions of approximately 20 micro-inches. The bending of the stator end portions 14 in response to rotation of the shaft 11 produces a spring force tending to rotate the shaft back to its original position.

Another bearing arrangement embodying the invention will now be described with reference to FIGURES 5 and 6.

The bearing arrangement comprises a stator part and a rotor part. The rotor part includes an end plate 30 having a tubular extension 32 containing a tight-fitting cylindrical plug 33. The plug 33 has an end 34 which is positioned in a recess in the end plate 30 and is threaded for attachment to the shaft (not shown).

The plug 33 contains three apertures 35 which pass through it, intersecting its axis Z. Each aperture 35 includes a straight-sided portion 35A running into a portion having diverging sides 35B which meets a corresponding aperture 32A in the wall of the tubular extension 32. The axes of the straight-sided portions 35A of the apertures 35 are angularly displaced by 120° with respect to each other about the axis Z, and each portion 35A houses a ball 36. Each ball 36 is located between the sides of the straight-sided portion of the respective aperture 35 and the inner surface of the wall of the tubular portion 32, each ball having a diameter slightly greater than the radius of the plug 33.

The stator part of the bearing arrangement comprises three plates 37, 38 and 39 each of which has a straight-sided slot 40 cut in it, each slot having a greater width than the diameter of the tubular portion 32 and extending from the periphery of the plate for a distance greater than the radius of the plate. One of the plates, the plate 39, has a diameter which is considerably greater than that of the other two plates 37 and 38. A bore 41 in each plate 37 to 39 extends from the closed end of each slot 40 and locates the cylindrical end of a frusto-conically shaped plug member 42. The plug members 42 are rigidly fixed in the respective bores 41 by adhesive. Each plug member 42 has a substantially flat angled end surface 43.

The slots 40 enable the three plates 37 to 39 to be placed in position over the tubular extension 32 as shown in FIGURE 5, so that each plug member 42 extends into a respective one of the apertures 35 in the plug 33. The plug members 42 are so positioned in the bores 41 that all the end surfaces 43 partially face in the direction of the arrow A (FIGURE 5). The three members 37 to 39 have respective holes 45 which are aligned with one another when the plug members 42 project centrally into the respective apertures 35. A headed bolt 46 is passed through these three holes 45 and screwed into the plate 37 so as to hold the plates 37 to 39 together. The bolt 46 has an end 47 which projects into a slot 48 in the end plate 30.

In use, the shaft (not shown) is attached to the threaded end 34 of the plug 33. End load is then applied to the shaft in the direction opposite to that of the arrow A and causes the balls 36 to come into point contact with the end surfaces 43 of the plug members 42, the points of contact lying on the axis Z and the end surfaces 43 lying oblique to the axis Z. The shaft is now constrained for limited rotation about an axis constituted by the axis Z.

The particular application of the bearing arrangement determines how the end load is produced. In one application, for example, the shaft attached to the plug 33 is attached at its other end to another, similar, plug positioned in a tubular extension projecting in the opposite direction to the extension 32. This other plug and tubular extension constitute part of a bearing arrangement identical with that shown in FIGURES 5 and 6, except that the end surfaces corresponding to the end surfaces 43 partially face in the opposite direction to that of arrow A. The two bearing arrangements are arranged so that each provides an end load for the other to constrain the shaft to rotate about the axis Z. The end surfaces 43 are angled to an extent which is sufficient to produce reaction forces having components acting along the axis Z of magnitude great enough to support the end load.

In another application (not shown), the bearing arrangement illustrated is mounted with the axis Z vertical so that gravity provides the end load acting in the opposite direction to the arrow A.

Figure 6:
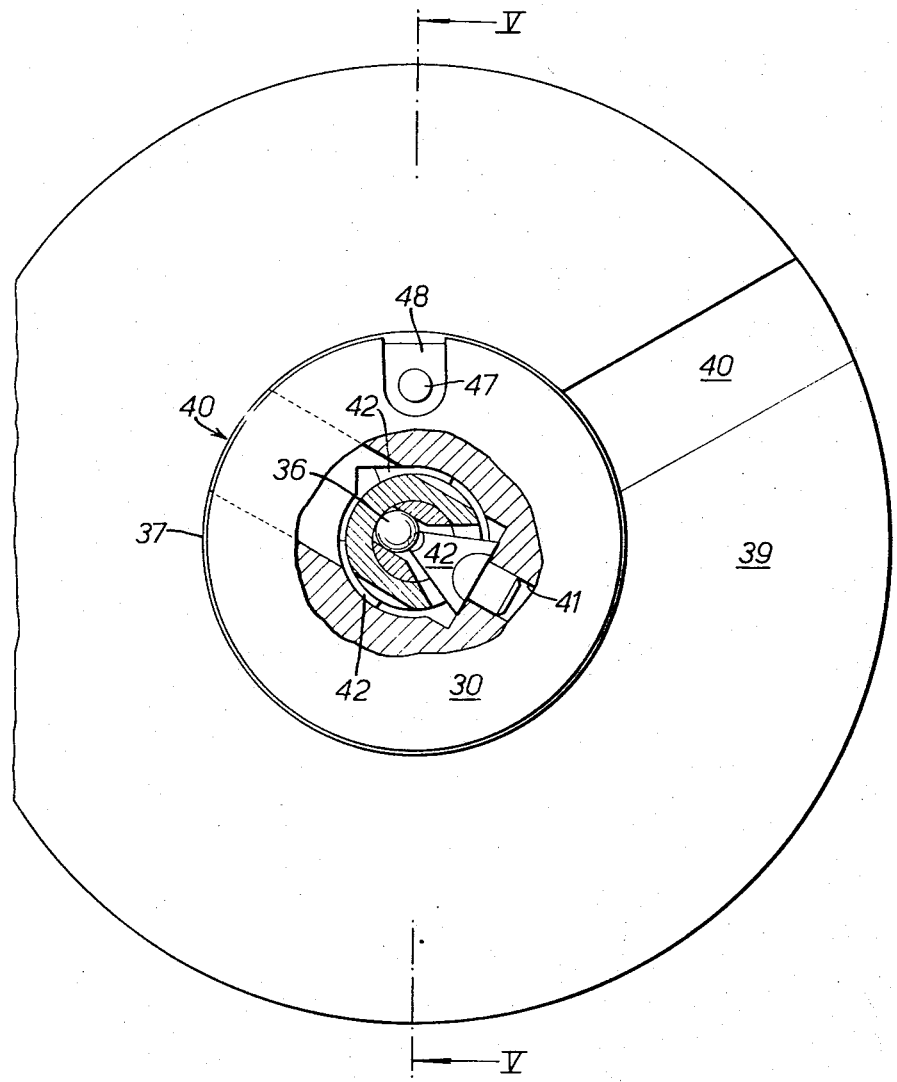
FIGURE 6 shows an end elevation, partly in section on the line VI—VI of FIGURE 5, of the bearing arrangement of FIGURE 5.

As with the bearing arrangement of FIGURES 1 to 4, the bearing arrangement of FIGURES 5 and 6 provides mating contact bearing surfaces (that is, the balls 36 and the end surfaces 43) providing points of contact which all lie on the axis of rotation Z. Therefore, any friction present has no moment arm with which to apply a torque about the axis Z, thus substantially preventing the creation of rotational friction.

The end 47 of the bolt 46 co-operates with the sides of the slot 48 in the end plate 30 so as to limit the rotation of the shaft to such an extent as to prevent the sides of the plug members 42 from coming into contact with the sides of the apertures 35; such contact might cause damage.

In preferred embodiments of the bearing arrangement according to the invention, each bearing arrangement has three pairs of mating contact bearing surfaces as illustrated. The provision of three pairs of mating contact surfaces causes the bearing arrangement to be self-aligning when end load is applied to the shaft. If more than three pairs of mating contact surfaces are used, the great manufacturing accuracy needed to ensure that, in use, the points of contact between the bearing surfaces lie on a straight line, renders the bearing arrangement less advantageous. If less than three pairs of mating contact surfaces are used, then the bearing arrangement does not provide positive location in all attitudes. However, in some applications, for example where the axis Z is horizontal at all times, then only two pairs of mating contact surfaces may be satisfactory. In such a case, for example, the plug member 42 in the plate 38 of the arrangement of FIGURES 5 and 6, and the corresponding ball 36, could be dispensed with.

It will be appreciated that the end surfaces 43 (FIGS. 5 and 6) or the end surfaces of the plug members 18 (FIG. 1) need not be flat, but may be depressed instead. It is not necessary to use the balls 36 (FIGS. 5 and 6) or the conically shaped members 19 (FIG. 1) to provide the mating contact surfaces; any member having a raised surface will suffice, though it is essential that the mating contact surfaces should be such that only point contact occurs between them.

The arrangements may be modified by locating the flat or depressed surfaces in the apertures formed in the shaft and plug, instead of on the end of the plug members supported by the stator, and by locating the raised surfaces on the ends of the plug members supported by the stator, instead of in the apertures. However, it has been found more satisfactory to construct the arrangements in the form illustrated.

The contact surfaces provided by the conically shaped members 19, and the balls 36, may be provided instead by surfaces which are formed in the plug in the shaft.

The mating contact surfaces can be fabricated from any suitable hard material such as ceramic or jewel, for example. The tubular extensions 12, 32 may be provided with hardened liners to support the conically shaped members 19 or the balls 36.

The bearing arrangement illustrated in the figures are particularly suitable for use as bearings for gyroscope gimbals and accelerometers, for example for use in inertial platforms. In such applications, the extremely low rotational friction of the bearing arrangements is very advantageous and the limited extent of the rotation permissible is quite acceptable. A pair of the bearings described can be arranged to provide an isoelastic support for a shaft, that is, they provide equal resistance to all forces applied to the shaft in any direction.

I claim:

1. A bearing arrangement comprising two members, and means relatively supporting the two members for limited rotation with respect to each other about an axis passing through one said member, the said means including,
   means defining at least two spaced apertures in the said one member each intersected by the said axis,
   a first pair of bearing parts,
   a second pair of bearing parts,
   each bearing part of one pair having a raised surface and each bearing part of the other pair having a non-raised surface,
   means locating each bearing part of the first pair in a respective said aperture so that the said surface of the bearing part is intersected by the said axis, the normals to the surfaces of the bearing part of the first pair at the points where they are respectively intersected by the axis lying in respective mutually inclined axial planes,
   and means supporting the bearing parts of the second pair on the other said member so that each bearing part of the second pair projects into a respective said aperture and makes point contact with the bearing part of the said first pair located therein at the point of intersection by the said axis,
   the bearing parts with the said non-raised surfaces being positioned with the non-raised surfaces all oblique to the said axis so that the non-raised surfaces all partially face the same direction along the axis.

2. A bearing arrangement according to claim 1, in which each bearing part of the said one pair is a ball.

3. A bearing arrangement according to claim 1, in which each bearing part of the said one pair is a conically shaped element.

4. A bearing arrangement comprising two members and means relatively supporting the members for limited rotation with respect to each other about an axis passing through one said member, the said means comprising
   means defining at least three spaced apertures in the said one member each intersected by the said axis,
   three bearing parts, each having a raised surface and respectively located in the apertures with each said raised surface being intersected by the said axis so that the normals to the raised surfaces at the points where they are respectively intersected by the axis lie in respective axial planes which are mutually inclined about the axis with the angle between adjacent planes being less than 180°,
   three arms supported by the other said member respectively projecting into the apertures,
   the distal ends of the arms having non-raised surfaces which lie oblique to the said axis and all partially face in the same direction along the axis and which respectively make point contact with the said raised surfaces at the points where they are respectively intersected by the axis.

5. A bearing arrangement according to claim 4, in which each said bearing part having a raised surface is a ball, and in which the said one member is a shaft and the said other member is a stator arranged to receive the shaft.

6. Apparatus comprising
   a shaft having three spaced apertures each intersected by the axis of the shaft,
   three balls respectively located in the apertures so as to be intersected by the said axis,
   the normals to the surfaces of the balls at the points where they are respectively intersected by the axis lying in respective axial planes which are mutually inclined about the axis with the angle between adjacent planes being less than 180°,
   stator means,
   three arms each having one end supported by the stator means and a distal end with a substantially flat surface which projects into a respective said aperture and makes point contact therein with the said ball therein at the point of intersection by the said axis,
   the substantially flat distal end surfaces of the said arms lying oblique to the said axis so that they all partially face in the same direction along the said axis.

7. A bearing arrangement according to claim 6, in which the said stator means includes three relatively fixed support elements each shaped to define a slot having an open end and a closed end,
   means mounting each said arm at the closed end of the respective one of the slots so that it projects along the slot towards the open end thereof,
   and means mounting the said support elements so that each slot fits over the said shaft.

8. In apparatus including an inertial platform and attitude sensitive means,
   a shaft forming part of the attitude sensitive means,
   a stator assembly,
   and bearing means supporting the shaft for limited rotation relative to the stator assembly, the bearing means comprising
   means defining three spaced first apertures in the shaft near one end of the shaft, each intersected by the axis of the shaft,
   means defining three spaced second apertures in the shaft near the opposite end of the shaft each intersected by the said axis,
   three first bearing parts respectively located in the three first apertures and having first bearing surfaces intersected by the said axis with the normals to the said surfaces at the points where they are respectively intersected by the axis lying in respective axial planes which are mutually inclined about the axis with the angle between the adjacent planes being less than 180°,
   three further first bearing parts respectively located in the three second apertures and having further first bearing surfaces intersected by the said axis with the normals to the said further surface at the points where they are respectively intersected by the axis lying in respective axial planes which are mutually inclined about the axis with the angle between adjacent planes being less than 180°,
   six second bearing parts each having a second bearing surface,
   means supporting the second bearing parts on the said stator assembly so that they respectively project into the said apertures with the said second bearing surface respectively making point contact with the said first bearing surfaces at the points of intersection by the said axis, one surface of each pair of point-contacting surfaces in each aperture being raised surface and the other surface of the pair being a non-raised surface, each non-raised surface lying oblique to the said axis, and the non-raised surfaces in the apertures near the said one end of the shaft all partially facing along the said axis towards the non-raised surfaces in the apertures near the said one opposite end of the shaft.

9. A bearing arrangement according to claim 8, in which each said first bearing part is a ball.

10. Apparatus comprising a shaft having an axis passing therethrough, means at one end of the said shaft defining three first spaced apertures each intersected by the said axis, means at the opposite end of the shaft defining three second spaced apertures each intersected by the said axis, each aperture having an open end and having a closed end spaced from said axis by a predetermined distance, six balls each having a diameter slightly greater than the said predetermined distance and each located in a respective said aperture so as to be intersected by the said axis, the normals to the surface of the balls in the said first apertures at the points where they are intersected by the axis lying in respective axial planes which are mutually inclined about the axis with the angle between adjacent planes being less than 180°, and the normals to the surfaces of the balls in the second apertures at the points where they are intersected by the axis lying in further respective axial planes which are mutually inclined about the axis with the angle between the adjacent said further planes being less than 180° and, a base;

first stator means comprising three plates each defining an open-ended slot having a width greater than the diameter of the shaft, three projecting arms each having a substantially flat distal end surface, means respectively locating the arms in the said slots so that they project towards the open ends thereof, means holding the plates in side-by-side relationship so that the said open-ended slots fit over the said shaft with each projecting arm projecting into a said first aperture with its distal end surface making point contact with the surface of the ball located therein at the point of intersection with the said axis, and means attaching the three said plates to the said base;

second stator means comprising three further plates each defining an open-ended slot having a width greater than the diameter of the shaft, three further projecting arms having a substantially flat distal end surface, means respectively locating the arms in the said slots so that they project towards the open ends thereof, means holding the further plates in side-by-side relationship so that the said open-ended slots fit over the said shaft with each further projecting arm projecting into a said first aperture with its distal end surface making point-contact with the surface of the ball located therein at the point of intersection with the said axis, and means attaching the three said further plates to the said base;

the distal end surfaces of the said projecting arms of each stator means lying oblique to the said axis and all partially facing along the said axis towards the distal end surfaces of the projecting arms of the other said stator means.

11. Apparatus according to claim 10, in which each said supporting arm is a frusto-conically shaped element.

12. Apparatus according to claim 10, in which each said means defining the three said first apertures at a said end of the said shaft comprises a tubular extension, a plug located in the tubular extension, and means attaching the tubular extension to the appropriate end of the said shaft, each said aperture being defined by a bore in the said plug communicating at one end only with an opening through the tubular extension.

References Cited

UNITED STATES PATENTS

| 2,984,113 | 5/1961 | Ransom | 74—5 |
| 3,074,765 | 1/1963 | Hadley | 308—2 |
| 3,246,527 | 4/1966 | Callahan | 74—5 |
| 3,252,337 | 5/1966 | Degener | 74—5 |

MARTIN P. SCHWADRON, *Primary Examiner.*

ROBERT A. DUA, *Examiner.*